United States Patent
Gaddy et al.

(10) Patent No.: US 7,022,838 B2
(45) Date of Patent: Apr. 4, 2006

(54) POLYSACCHARIDE GUM AND PROCESS FOR ITS MANUFACTURE

(75) Inventors: James M. Gaddy, Decatur, IL (US); Penelope A. Patton, Decatur, IL (US)

(73) Assignee: Tate & Lyle Ingredients Americas, Inc., Decatur, IL (US)

( * ) Notice: Subject to any disclaimer, the term of this patent is extended or adjusted under 35 U.S.C. 154(b) by 0 days.

(21) Appl. No.: 10/945,482

(22) Filed: Sep. 20, 2004

(65) Prior Publication Data

US 2005/0038241 A1    Feb. 17, 2005

Related U.S. Application Data

(62) Division of application No. 10/152,873, filed on May 21, 2002, now Pat. No. 6,881,838.

(51) Int. Cl.
| | |
|---|---|
| C08B 37/00 | (2006.01) |
| C07H 1/00 | (2006.01) |
| C07H 1/04 | (2006.01) |
| C07H 1/06 | (2006.01) |

(52) U.S. Cl. .............. 536/114; 536/124; 536/127; 536/128

(58) Field of Classification Search ............ 536/114, 536/124, 127, 128
See application file for complete search history.

(56) References Cited

U.S. PATENT DOCUMENTS 3,355,447 A    11/1967    O'Connell .......... 260/209

(Continued)

FOREIGN PATENT DOCUMENTS

| EP | 0 028 446 | 5/1981 |
|---|---|---|
| EP | 0 068 706 | 1/1983 |
| EP | 0 690 072 | 1/1996 |
| GB | 1488645 | 10/1977 |
| GB | 1528316 | 10/1978 |
| GB | 2 051 104 | 1/1981 |

OTHER PUBLICATIONS

PCT/US03/13591 International Search Report (Oct. 30, 2003).

(Continued)

*Primary Examiner*—James O. Wilson
*Assistant Examiner*—Everett White
(74) *Attorney, Agent, or Firm*—Williams, Morgan & Amerson, P.C.

(57) ABSTRACT

Processes are disclosed for the purification and recovery of polysaccharide gums from an aqueous solution, particularly xanthan gum from a fermentation broth. An aqueous solution of at least one polysaccharide gum is mixed with a non-solvent stream comprising water and a subprecipitant level of a non-solvent of the polysaccharide gum. The mixture is concentrated to increase the polysaccharide gum concentration, and optionally undergoes a heat treatment. Additional non-solvent is added to the concentrated mixture to precipitate the polysaccharide gum. The precipitated gum is dried after being separated from the liquid component of the mixture. The removed liquid component can be recycled to the earlier step in the process in which the polysaccharide gum solution is mixed with the non-solvent stream.

15 Claims, 10 Drawing Sheets

U.S. PATENT DOCUMENTS

| | | | |
|---|---|---|---|
| 3,591,578 A | 7/1971 | Colin et al. | 260/209 |
| 3,988,313 A | 10/1976 | Bouniot | 536/1 |
| 4,135,979 A | 1/1979 | Corley et al. | 195/31 |
| 4,299,825 A | 11/1981 | Lee | 424/180 |
| 4,316,012 A | 2/1982 | Inkson et al. | 536/114 |
| 5,416,206 A | 5/1995 | Nagura et al. | 536/114 |
| 5,679,556 A | 10/1997 | Homma et al. | 435/104 |
| 6,391,596 B1 | 5/2002 | Talashek et al. | 435/104 |

OTHER PUBLICATIONS

Callet et al., *Carbohydrate Polymers* 11:127-137 (1989).

Garcia-Ochoa et al., *Biotechnology Advances* 18:549-579 (2000).

Garcia-Ochoa et al., *Separation Science and Technology* 28(6):1303-1313 (1993).

Pace et al., *Advances in Biochemical Engineering* 15:41-70 (1980).

Smith et al., *J. Chem. Tech. Biotechnol.* 32:119-129 (1982).

Figure 9

| Broth viscosity* | MW | Visc of Gum Heat Treated, no IPA | visc of gum Heat Treated w/IPA | % increase in gum visc due to IPA |
|---|---|---|---|---|
| 4950 | 3.1 MM | 944 | 1333 | 41% |
| 4600 | 2.7 MM | 854 | 1419 | 66% |
| 3950 | 2.3 MM | 460 | 1016 | 121% |

IPA was at 30%

Figure 10

| | Keltrol | Keltrol | Keltrol RD | ADM 200 | Rhodigel | Rhodigel Ultra | lab-generated xanthan |
|---|---|---|---|---|---|---|---|
| Viscosity of as-received gum | 715 | 689 | 715 | 813 | 858 | 832 | 1141 | 1220 |
| Visc. after alcohol heat treatment | 1230 | 1340 | 850 | 1470 | 1320 | 1400 | 1410 | 780 |
| % change | 72% | 94% | 19% | 81% | 54% | 68% | 24% | -36% |

POLYSACCHARIDE GUM AND PROCESS FOR ITS MANUFACTURE

This a Divisional of Ser. No. 10/152,873 filed on May 21, 2002 now U.S. Pat. No. 6,881,838.

BACKGROUND OF THE INVENTION

1. Field of the Invention

The present invention relates generally to recovering a polysaccharide gum from an aqueous fluid in which the gum is dissolved. More particularly, it relates to methods involving concentration, heat-treatment, and precipitation of a polysaccharide gum, and to polysaccharide gums recovered using such methods.

2. Description of Related Art

Certain polysaccharide gums (e.g., xanthan gum), which are hydrocolloids, are used in food, pharmaceutical, industrial, and oil field applications, because of their rheology. Addition of certain polysaccharide gums in foods can aid in making water-based products thicker, creamier, more visually appealing, and more stable over a wider range of temperature, pH and time. In non-food related applications, certain polysaccharide gums can provide viscosity for suspension, improved stability, and/or thickening of fluids. For example, in oil and gas drilling, certain polysaccharide gums can be used to modify the rheology of a fluid and to enhance the efficiency of drilling, workover, and completion operations.

Certain useful polysaccharide gums are extracted from plant material. For example, carrageenan is extracted from certain species of the class Rhodophyceae (red seaweed). Microorganisms can produce certain polysaccharide gums. Xanthan gum, for example, is a polysaccharide that can be produced by fermentation using bacterium of the *Xanthomonas* sp. Gellan gum is the generic name of a polysaccharide that can be produced by cultured *Pseudomonas elodea* or related organisms. Curdlan is a polysaccharide gum that can be produced by a microorganism (e.g., *Alcaligenes faecalis varmyxogenes*). Still other polysaccharide gums can be produced either by extraction from plant material or by microbial fermentation. Alginate is a polysaccharide gum that can be obtained by extraction from certain species of seaweed, or alternatively *Azotobacter vinelandii* or *Pseudomonas aeruginosa* can be used to produce the polysaccharide gum through fermentation.

Certain processes for the recovery and purification of polysaccharide gums (such as alginate, carrageenan, xanthan, pectin, gellan, welan, pullulan, curdlan, rhamsan, and sphingan polymers) from an aqueous fluid in which they are dissolved rely on a water-miscible non-solvent precipitation of the gum, such as an alcohol precipitation, among others. The aqueous fluid can comprise polysaccharides that are the products of microbial fermentation or extraction from a plant material. For example, isopropanol, ethanol, or acetone (e.g., water-miscible non-solvents of xanthan gum) can be used to precipitate xanthan gum from aqueous solution. In certain cases, the addition of salt(s) or adjustment of pH can reduce the amount of non-solvent required for precipitation of a polysaccharide gum. Following precipitation the gum can be dewatered and dried.

Recovery of a polysaccharide gum can be a difficult and expensive process, because polysaccharide gums can be viscous even at low concentrations, making handling difficult. Thus, mixing of reagents with the gum can be a power intensive process. The relatively low concentration of gum in fermentation broth (often less than about 5%) and in extracts from plant materials, as well as the high cost of certain gum non-solvents, and the losses associated with distillation of the gum non-solvent significantly impact the cost of processing polysaccharide gums.

Research to improve processes for the recovery of polysaccharide gums dissolved in aqueous fluid has focused on methods of reducing the amount of gum non-solvent needed to precipitate gum. Such methods have involved:

1. increasing gum concentration in an aqueous fluid comprising dissolved polysaccharide gum prior to non-solvent addition (e.g., via improved fermentation/extraction methods that achieve higher yield and concentration of the polysaccharide or via concentrating the extracts or fermentation products);
2. adding multivalent cations to an aqueous fluid comprising certain dissolved polysaccharide gums in order to increase precipitation efficiency, and reduce the amount of non-solvent that must be added; and
3. in addition to adding multivalent cations to an aqueous fluid comprising certain dissolved polysaccharide gums, adjusting its pH in order to increase precipitation efficiency, and reduce the amount of non-solvent that must be added.

Such methods have their drawbacks. As stated above, it can be difficult to work with concentrated polysaccharide gum solutions, because even at relatively low concentrations of polysaccharide gum (less than about 5%), the solutions can be extremely viscous and difficult to handle. It can be difficult to remove biomass from polysaccharide gum fluids having relatively high concentrations of the polysaccharide gum that are obtained through methods involving fermentation processes. Furthermore, addition of cations and pH adjustment can result in the production of polysaccharide gum products (e.g., salts of polysaccharide gums) that have reduced solubility. Therefore, there is a long-standing need for improved processes for recovering polysaccharide gums.

SUMMARY OF THE INVENTION

Certain embodiments of the present invention are directed to methods of recovering at least one polysaccharide gum from an aqueous fluid. Methods of the present invention can be performed either as batch processes or continuous processes. In certain embodiments the polysaccharide gum is selected from the group consisting of xanthan gum, welan, gellan, pullulan, carrageenan, alginate, pectin, rhamsan, curdlan and sphingan polymers. The aqueous fluid comprises water and between about 1 wt % and 10 wt % of at least one polysaccharide gum that is substantially dissolved in the aqueous fluid (e.g., at least about 95 wt % of the polysaccharide gum present in the fluid is dissolved). The aqueous fluid can also comprise at least one impurity and in certain embodiments the impurity is a soluble impurity. The polysaccharide gum can be (1) a product of fermentation, (2) a compound extracted from a plant, or (3) a dried polysaccharide gum dissolved in aqueous solution, wherein the dried polysaccharide gum was recovered by a process previously performed.

The aqueous fluid is mixed with an organic non-solvent stream comprising water and an organic non-solvent to produce a first mixture. The aqueous fluid can be concentrated, by filtration for example, before mixing it with the organic non-solvent stream. The organic non-solvent is a non-solvent for the polysaccharide gum that is to be recovered from the aqueous fluid, and in certain embodiments it can be selected from the group consisting of isopropyl alcohol, methanol, ethanol, acetone, and other solvents of similar polarity, as well as mixtures thereof. Thus, the organic non-solvent can comprise a mixture of organic compounds.

The first mixture comprises a sub-precipitant concentration of the organic non-solvent (the concentration of the organic non-solvent is below the minimum level at which the polysaccharide gum begins to precipitate from solution), water, and dissolved polysaccharide gum. In certain embodiments in which the polysaccharide gum is xanthan gum and the organic non-solvent is isopropyl alcohol, the sub-precipitant amount of organic non-solvent in the first mixture can be between about 5 and 45% by weight of the first mixture.

The first mixture is concentrated, thereby increasing the polysaccharide gum concentration. Impurities soluble in at least one of the aqueous solution or the organic non-solvent can also be removed by the concentration step. Thus this concentration step yields a concentrated first mixture and a stream of components removed from the first mixture. In certain embodiments the concentration of the first mixture is achieved by filtration using methods known in the art. The stream of removed components comprises water, any soluble impurities present, and non-solvent.

After concentration, the organic non-solvent concentration in the first mixture is still at a sub-precipitant level. An additional amount of organic non-solvent is mixed with the concentrated first mixture, thereby producing a second mixture. As additional organic non-solvent is mixed with the first mixture, some of the polysaccharide gum may precipitate before a precipitating concentration of non-solvent is achieved throughout the second mixture. The second mixture comprises (A) a liquid component comprising organic non-solvent and water, wherein the organic non-solvent concentration in the second mixture is sufficient to precipitate a majority of the polysaccharide gum present in the second mixture, and (B) precipitated polysaccharide gum.

In certain embodiments, the stream of removed components can be distilled to recover organic non-solvent that can also be recycled and used (1) as a component of the organic non-solvent stream or (2) as at least a portion of the additional amount of organic non-solvent that is mixed with the concentrated first mixture to achieve precipitation of the polysaccharide gum.

In certain embodiments, the second mixture is separated into a first fraction and a second fraction. This can be accomplished by centrifugation, decanting or methods of solid/liquid separation known in the art. The first fraction comprises a majority of the liquid component and the second fraction comprises substantially all of the precipitated polysaccharide gum. The first fraction can then be recycled as a component of the organic non-solvent stream to be mixed with the first aqueous fluid in subsequent rounds of the process. The second fraction can be (a) dried directly to produce a first dried polysaccharide gum product (e.g., comprising less than about 12 wt % water), or (b) optionally, the second fraction can be washed with organic non-solvent or a solution of water and organic non-solvent prior to drying. Organic non-solvent and water driven off as the second fraction is dried can be added to the organic non-solvent stream mixed with the first aqueous fluid to produce the first mixture. In other embodiments at least some of the organic non-solvent and water driven off during drying can be condensed, filtered, and distilled to recover organic non-solvent, and the distilled organic non-solvent can be used as a component of the second mixture. In certain embodiments, the method further comprises treating the first mixture at a temperature and for a time sufficient to cause at least some increase in the viscosity of the polysaccharide gum. The heat treatment can be performed at least one of before, after, or during concentrating the first mixture, and before the precipitation step. The first dried polysaccharide gum product recovered using methods described above involving a heat treatment can be a heat-treated first dried xanthan gum product.

Upon rehydration of the heat-treated first dried xanthan gum product it can have a viscosity that is at least 10% greater than that of a rehydrated second dried xanthan gum product prepared by a method comprising, providing a second aqueous fluid comprising water and xanthan gum having the same or similar composition as that provided for preparing the first dried xanthan gum product. The second aqueous fluid is heat treated at the same temperature and for the same duration as the first mixture in preparing the first dried xanthan gum product. Next the heat-treated second aqueous fluid is mixed with sufficient organic non-solvent to produce a third mixture. The third mixture comprises (A) a liquid component comprising the organic non-solvent and water, wherein the organic non-solvent concentration in the third mixture is sufficient to precipitate a majority of the xanthan gum present in the third mixture, and (B) a second precipitated xanthan gum. The third mixture is separated into an A fraction and a B fraction, wherein the A fraction comprises a majority of the liquid component and the B fraction comprises substantially all of the second precipitated xanthan gum. Finally, the B fraction is dried to produce a second dried xanthan gum product. Thus, the heat treatment used in preparing the second dried xanthan gum product is not performed on a fluid comprising an organic non-solvent, as is the case with the heat treatment used in preparing the first dried xanthan gum product.

Certain embodiments of the present invention are directed to methods of recovering xanthan gum from an aqueous fluid. The aqueous fluid comprises between about 1 wt % and 10 wt % dissolved xanthan gum. The aqueous fluid is mixed with an organic non-solvent stream comprising water and an organic non-solvent of xanthan gum, thereby producing a first mixture. The first mixture comprises a sub-precipitant concentration of the organic non-solvent. The xanthan gum in the first mixture is concentrated (for example, by filtration of the first mixture) by removal of at least some of the water, soluble impurities if present, and the non-solvent (e.g., the stream of removed components). The stream of removed components can be distilled to recover organic non-solvent. Distilled organic non-solvent can be recycled and used (a) as a component of the organic non-solvent stream or (b) as at least a portion of the additional amount of organic non-solvent that is mixed with the concentrated first mixture to achieve precipitation of the xanthan gum.

After concentrating the first mixture, the organic non-solvent concentration is still below the minimum concentration at which the xanthan gum begins to precipitate. The first mixture is heated to a temperature of between about 90° C. and about 125° C. for at least about five minutes, and this heat treatment can occur at least one of before, after or during the step of concentrating the first mixture, and before the precipitating step. When the organic non-solvent of the xanthan gum solution is isopropyl alcohol, isopropanol can comprise between about 5 and 45% by weight of the first mixture. Additional organic non-solvent is then mixed with the first mixture, thereby producing a second mixture. The second mixture comprises (A) a liquid component comprising the organic non-solvent and water, wherein the organic non-solvent concentration in the second mixture is sufficient to precipitate a majority of the xanthan gum present in the second mixture, and (B) precipitated xanthan gum. The second mixture can be separated into a first fraction and a second fraction, wherein the first fraction comprises a majority of the liquid component and the second fraction comprises substantially all of the precipitated xanthan gum.

In certain embodiments, the second mixture is separated into a first fraction and a second fraction, as described above, and the second fraction can be dried, or washed and dried to produce a dried xanthan gum product. In certain embodiments, the dried xanthan gum product, when rehydrated in water, has a viscosity that is at least 10% greater than a rehydrated dried xanthan gum product that has been produced by alternative methods using heat treatment. The separated first fraction can be recycled, as described above to produce a first mixture.

Certain embodiments of the present invention directed to xanthan gum recovery can yield high quality xanthan gum, which meets the food chemical codex requirements for xanthan gum, and which has a viscosity in excess of 800 cps at 0.25% ds when measured on a Brookfield viscometer with a #4 spindle at 60 rpm and 75 degrees F. An improvement in the viscosity of a heat-treated xanthan gum of at least 100% (doubling the viscosity of an untreated gum) can be achieved consistently using certain embodiments of the present invention.

Polysaccharide gums recovered by methods of the present invention can have fewer color impurities than polysaccharide gums recovered using known methods. Furthermore, methods of the present invention can reduce the amount of distilled non-solvent that is needed to process and recover polysaccharide gums, and thus, can reduce both the capital and operating costs associated with distillation of organic non-solvents. Certain embodiments of the present invention which are directed to the recovery and processing of xanthan gum can result in precipitated gum being dried in a desirable form comprising somewhat discrete fibrous strands as opposed to gelatinous balls. Methods of the invention involving heat treatments can aid in maximizing improvements in viscosity for polysaccharide gums and in achieving consistent viscosity increases, particularly in xanthan gum recovery processes.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 9 depicts a comparison of fermentation broths, broths heat-treated in a conventional manner without IPA, and those heat-treated using a method of the present invention wherein the broth is heat-treated after the addition of IPA.

FIG. 10 depicts the effect on viscosity of xanthan gums in aqueous solution heat treated with or without isopropanol.

DESCRIPTION OF ILLUSTRATIVE EMBODIMENTS

Figure 1:
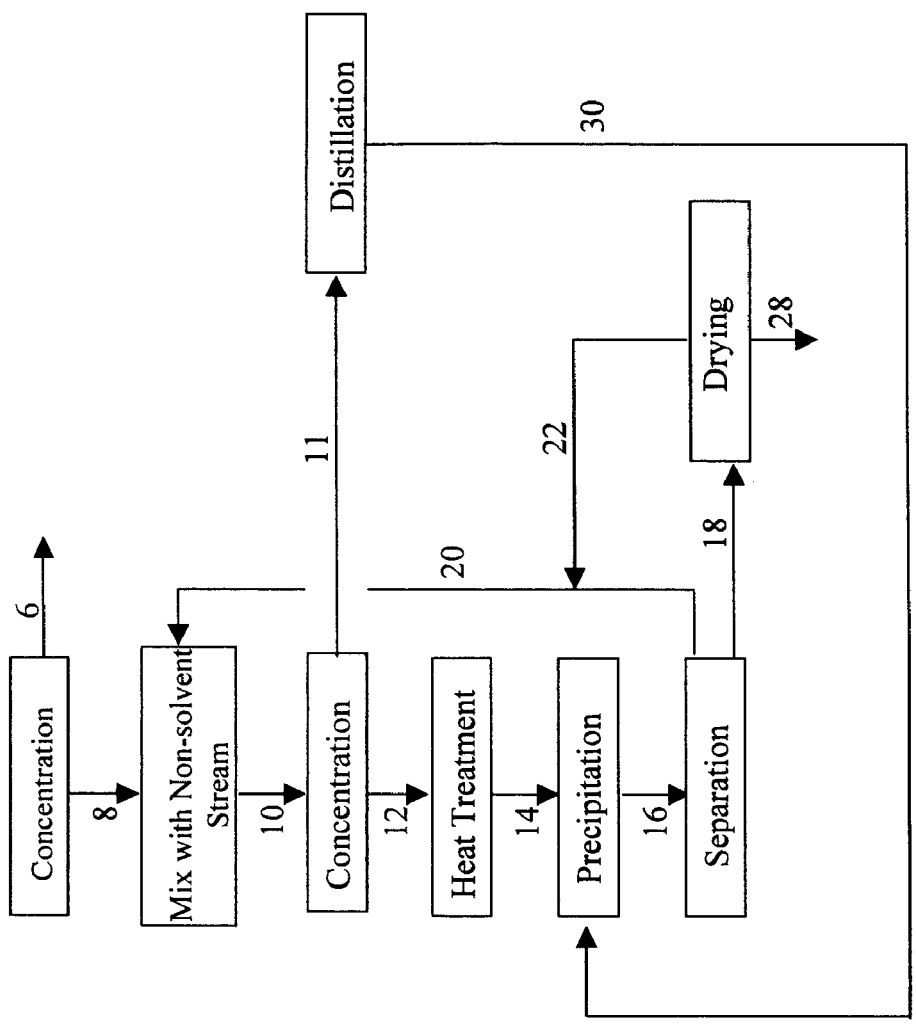
FIG. 1 is a process flow diagram of an embodiment of the present invention.

The process of the present invention can be used to recover a variety of polysaccharide gums from aqueous fluid. The process is especially well suited for recovery of xanthan gum, welan, gellan, pullulan, carrageenan, alginate, pectin, rhamsan, curdlan and sphingan polymers (e.g., S657, S7, S198, S88, NW11, and I-886, among others). Xanthan gum has a polymer backbone made up of β-1,4-linked D-glucose residues, and it has a trisaccharide branch made up of one glucuronic acid unit between two mannose units. The trisaccharide branch is linked to every other glucose unit in the polymer backbone at the number 3 position. Welan gum has a backbone composed of tetra saccharide units comprising D-glucose, D-glucuronic acid, D-glucose, and L-rhamnose, and the side chain consists of a single L-mannose or a single L-rhamnose unit. Gellan is a microbial polysaccharide, comprising a polymeric backbone having repeating tetra-saccharide units of glucose, glucuronic acid, glucose and rhamnose. Pullulan is a linear 1,4:1,6-α-D-glucan, consisting mainly of maltotriosyl units linked α-1,6 to the next maltotriosyl unit. Pullulan also comprises a small percentage of maltotetraosyl units, which are irregularly distributed within the polysaccharide. Carrageenan is a hydrocolloid consisting mainly of the potassium, sodium, magnesium, and calcium sulfate esters of galactose and 3,6-anhydro-galactose copolymers. Alginate is made up of two five carbon polymers, mannuronic acid and guluronic acid. The ratio of the acids varies in different alginates. Pectin is a methylated ester of polygalacturonic acid. Rhamsan has the same backbone as gellan and welan gums, but carries a disaccharide sidechain, while curdlan is a (1,3)-β-D-glucan.

Processes of the present invention can recover at least one polysaccharide gum from a fermentation broth, a plant extract, or an aqueous solution of a dried polysaccharide gum previously processed and dissolved. Thus, the polysaccharide gums can be fermentation products, solutions of compounds extracted from plant material, or solution of polysaccharide gums commercially available.

Preferably, the polysaccharide gum is xanthan gum that is produced by fermentation of a bacterium of *Xanthomonas* sp, particularly *Xanthomonas campestris*. Certain fermentation methods to produce xanthan gum involve propagating a *Xanthomonas campestris* strain from a slant culture through a standard inoculation train, and inoculating a bioreactor with a seed culture at a level of 2 to 10%. Certain xanthan gum fermentation methods involve growing the culture at a neutral pH in the presence of a suitable carbon source, nitrogen source, and appropriate vitamins and minerals. The production conditions, which are known in the art, are influenced by many factors including the type of fermentor, the media composition, the strain, the pH of the media, the temperature and dissolved oxygen concentration in the bioreactor. The xanthan gum fermentation produces an impure broth, which can comprise up to about 7 wt % xanthan gum that must be purified to meet established quality specifications for purity, color, flavor, odor and viscosity.

FIG. 1 shows an embodiment of the process for recovering a polysaccharide gum from a first aqueous fluid 8 comprising water and between about 1 and 10 wt % of at least one polysaccharide gum (e.g., xanthan gum, among others) that is substantially dissolved in the fluid. The first aqueous fluid 8 can, in certain embodiments, further comprise other components. For example, when the aqueous fluid is derived from a fermentation broth it can comprise unused media components (e.g., carbon source, among others), cellular debris, other fermentation products or metabolites. A fermentation broth, a plant extract, or other polysaccharide gum solution (e.g., an aqueous solution of commercially available polysaccharide gum) can be concentrated to produce the aqueous fluid 8. Concentration of a first aqueous fluid 8 (e.g. increasing the concentration of the polysaccharide gum) can be carried out using filtration or other methods known in the art, and the waste stream 6 produced by concentration can comprise impurities (e.g., certain impurities that can accumulate during fermentation). Impurities can be soluble or insoluble. Alternatively a first aqueous fluid 8 can comprise between about 1 and 10 wt % of at least one polysaccharide gum in a solution without concentration. For example, a fermentation for xanthan gum can be carried out that yields an unconcentrated fermentation broth having between about 1 and 10 wt % dissolved xanthan gum that can be used as a first aqueous fluid 8 in the present invention Undissolved components, such as biomass, among others, can be removed from a polysaccharide gum solution prior to its being used as a first aqueous fluid 8, or prior to its being concentrated for use as a first aqueous fluid 8.

The first aqueous fluid 8 is mixed with an organic non-solvent stream 20, which comprises water and a non-solvent of the polysaccharide gum that is to be recovered. The non-solvent is water miscible and can be an organic solvent selected from the group consisting of isopropyl alcohol, methanol, ethanol, acetone, other organic solvents of similar polarity, and mixtures of these solvents. When the polysaccharide gum to be recovered is xanthan gum, it is preferred that the organic non-solvent stream 20 comprises isopropyl alcohol and water. Preferably the organic non-solvent stream 20 is recycled from previous polysaccharide gum recovery processes or from other industrial processes. The organic non-solvent stream 20 can comprise water and a non-solvent recovered from drying a wet polysaccharide gum (e.g., second fraction) 22, described below, which also yields a first dried polysaccharide gum product 28. In addition to water the non-solvent stream 20 can also comprise organic non-solvent, which has been recovered from distillation processes. Preferably the non-solvent stream 20 is recycled from the downstream portion of the recovery process. It is mixed with the first aqueous fluid 8 to produce the first mixture. Preferably, the concentration of the organic non-solvent in the first mixture 10 comprising the first aqueous stream 8 and the organic non-solvent stream 20 is at a subprecipitant level. That is, the level of organic non-solvent in the mixture 10 is below that which would cause precipitation of the polysaccharide gum. The first mixture 10 is concentrated to increase the polysaccharide gum concentration. The organic non-solvent concentration in the concentrated first mixture 12 is below the minimum concentration at which the polysaccharide gum begins to precipitate. The water and non-solvent removed during concentration of the first mixture 10 are components of a stream 11, which can be distilled to recover non-solvent 30. When the polysaccharide gum being recovered from the aqueous fluid 8 is xanthan gum and the organic non-solvent being used is isopropyl alcohol, the sub-precipitant amount of organic non-solvent in the first mixture 10 is preferably between about 5 and 45% by weight of the first mixture, more preferably between about 20% and 40%, and most preferably between about 30% to 40%.

Concentration of the first mixture can be accomplished by filtering the first mixture 10 using microfiltration or by using other methods known in the art. The first mixture 10, 12, or both can be heat treated at a temperature and for a time sufficient to cause at least some increase in the viscosity of the polysaccharide gum. The heat treatment can be performed at least one of before, after, or during concentrating the first mixture and before precipitation. Preferably, when xanthan gum is being recovered, the first mixture 10, 12, or both is heat treated at a temperature of between about 90° C. and about 125° C. for at least about five minutes, more preferably for at least about 15 minutes.

Following the concentration of the first mixture and optional heat treatment, additional organic non-solvent 30 is mixed with the concentrated first mixture 12 or 14 (depending on whether a heat treatment is applied) thereby producing a second mixture 16, wherein the second mixture 16 comprises (A) a liquid component comprising organic non-solvent and water, wherein the organic non-solvent concentration in the second mixture is sufficient to precipitate a majority (e.g., greater than about 50 wt %) of the polysaccharide gum present in the second mixture, and (B) precipitated polysaccharide gum. The water and organic non-solvent 22, which are driven off during drying of the second fraction 18 can be condensed and distilled to recover the organic non-solvent which can be used as a component of the second mixture. As additional organic non-solvent is mixed with the first mixture some of the polysaccharide gum may precipitate before a precipitate concentration of non-solvent is achieved throughout the second mixture. Additional non-solvent is preferably the same non-solvent that is a component of the organic non-solvent stream, however in certain embodiments it can be a different non-solvent.

The second mixture 16 can be separated into a first fraction 20 and a second fraction 18, wherein the first fraction 20 comprises a majority (e.g., greater than 50 wt % of the liquid in the second mixture 16) of the liquid component (e.g., comprising water and non-solvent) and the second fraction 18 comprises substantially all (greater than about 95 wt %) of the precipitated polysaccharide gum. The organic non-solvent stream 20 used in the first mixture 10 comprises the separated first fraction 20 of the separation step, and it can further comprise the stream 22 described above. While the organic non-solvent stream is depicted in FIG. 1 as being recycled from a polysaccharide recovery process of the present invention, the organic non-solvent stream can be derived from other sources known in the art. For example, the organic non-solvent stream can comprise products or byproducts of another industrial process that comprise the non-solvent.

The second fraction 18 can be dried to produce a first dried polysaccharide gum product 28 (e.g., comprises less than about 12 wt % water). Preferably before the second fraction 18 is dried, it is washed with an organic non-solvent or a first solution comprising water and an organic non-solvent, wherein the concentration of the organic non-solvent in the first solution is greater than the concentration sufficient to precipitate a majority of the polysaccharide gum. The residual water and organic solvent 22 driven off by drying of the second fraction 18 can be condensed and can be a component of the organic non-solvent stream 20 used in preparing the first mixture. Part or all of the water and non-organic solvent 20 can be recovered from the separation step (e.g., directly from the first fraction), from the drying step (e.g., stream 22), and/or from the non-solvent component 30 of the non-solvent distillation. Optionally, at least a portion of stream 11 can be distilled to recover non-organic solvent 30, which can be used to precipitate the polysaccharide gum 16 from the first mixture. While the additional amount of organic non-solvent that is added to the concentrated first mixture is depicted in FIG. 1 as being recycled from distillation of non-solvent 11 from a polysaccharide recovery process of the present invention, the organic non-solvent can be derived from other sources. For example, it can be the product or byproduct of distillation from another industrial process. The methods described above for the recovery of a polysaccharide gum can be carried out as batch or continuous processes.

Figure 2:
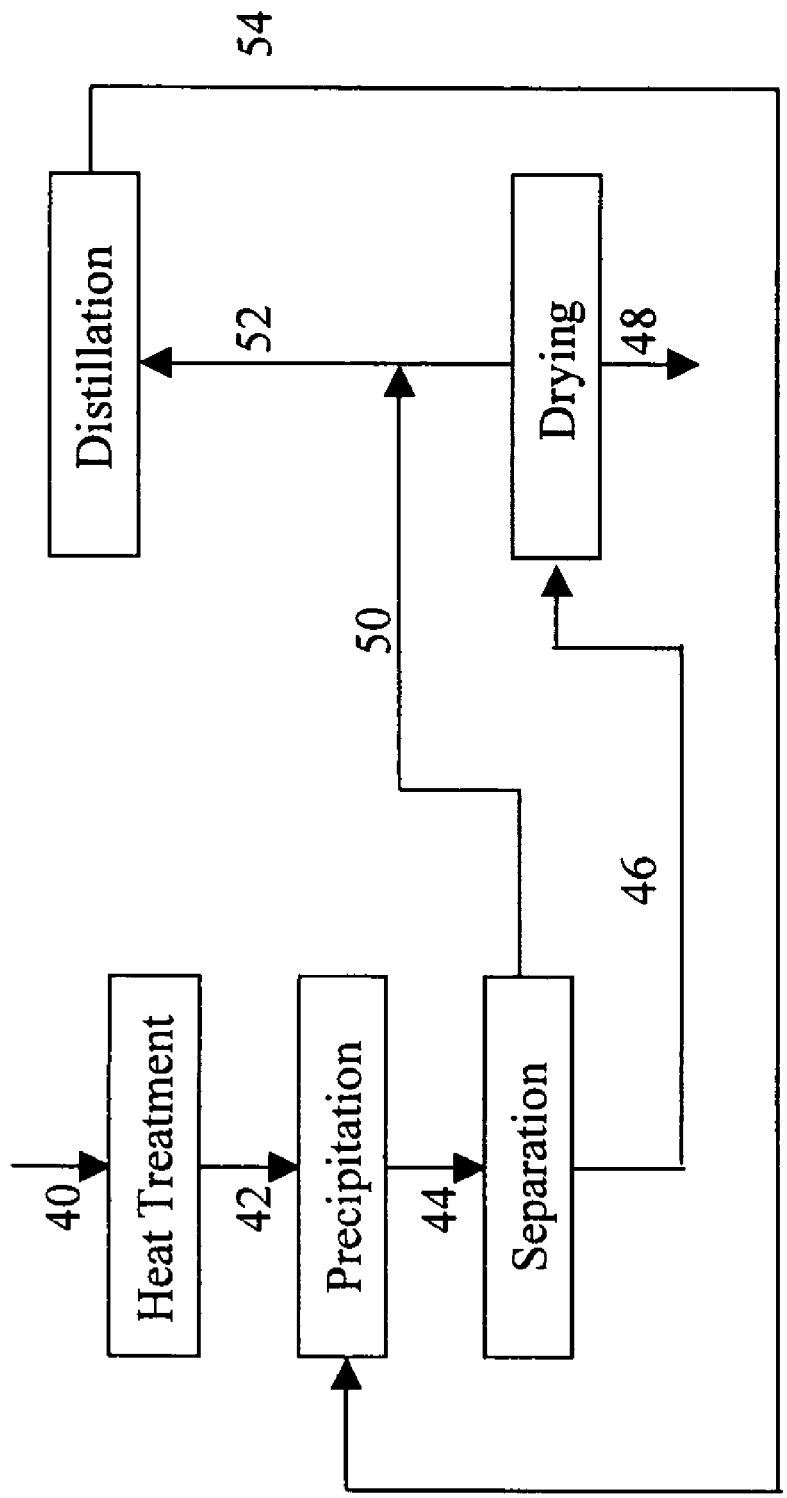
FIG. 2 is a process flow diagram of a process used for the recovery of a polysaccharide gum from an aqueous fluid involving distilled organic non-solvent.

Preferably when the polysaccharide gum being recovered in processes of the present invention is xanthan gum, and when the first dried polysaccharide gum product 28 is rehydrated it has a viscosity that is at least 10% greater than that of a rehydrated dried xanthan gum product which has been prepared by another method (e.g., an alternative method). A process flow diagram for such a second method is shown in FIG. 2.

A second aqueous fluid 40 comprising water and xanthan gum and having the same composition as that provided for preparing the first dried polysaccharide gum product 28 is heated treated at the same temperature and for the same duration as the first mixture 10 in preparing the first dried polysaccharide gum 28. Sufficient organic non-solvent 54 is mixed with the heat-treated second aqueous fluid 42 to produce a third mixture 44 comprising (A) a liquid component comprising organic non-solvent and water, and (B) a second precipitated xanthan gum. The water in the liquid component is water that was present in the second aqueous fluid 40, and the organic non-solvent concentration in the third mixture 44 is sufficient to precipitate a majority (greater than about 50 wt %) of the xanthan gum present in the third mixture 44. The third mixture 44 is separated into an A fraction 50 and a B fraction 46, wherein the A fraction comprises a majority (e.g., greater than 50 wt % of the liquid present in the third mixture) of the liquid component (e.g., comprising water and non-solvent), and the B fraction 46 comprises substantially all (e.g., greater than about 95 wt %) of the second precipitated xanthan gum. The B fraction 46 is dried to produce a second dried xanthan gum product 48. The water and organic non-solvent 52 driven off from drying can be distilled to recover the organic non-solvent 54, which can be used in subsequent rounds of the process to precipitate a polysaccharide gum from solution. Though the organic non-solvent used to precipitate the second xanthan gum is depicted in FIG. 2 as being recycled from the alternative polysaccharide recovery process, the distilled organic non-solvent can come from other industrial processes.

Most commercial xanthan gums undergo a heat treatment in order for them to provide the a higher viscosity per unit solids. Thus, xanthan gum and certain other polysaccharide gums, are typically heat treated in aqueous solution during industrial processing. Heat treatment causes changes in the xanthan gum structure, which increases the viscosity of the finished gum by anywhere from 20 to 50%. There can be wide variability in the increase of viscosity attained in xanthan gum products produced from different aqueous solutions despite their undergoing identical heat treatments, particularly when the aqueous solutions are fermentation broths.

As stated above, industrial processes typically involve heat treatment of aqueous solutions of polysaccharide gums. Embodiments of the present invention involve heat treatment of a mixture comprising an aqueous polysaccharide gum solution and a water miscible non-solvent. The increase in viscosity attained in xanthan gum products of certain embodiments of the present invention can be more consistent than the viscosity attained using processes in which only the aqueous solution is heat treated. Certain embodiments of the present invention involving heat treatment can further produce xanthan gum product, which can be dried in the form of somewhat discrete fibrous strands, as opposed to gelatinous balls which can be produced from certain industrial processes currently in use, and which are less desirable.

Certain processes being used in industry result in polysaccharide gum products with various shortcomings, including the high cost of production. One of the key cost drivers in xanthan gum purification processes involves the expense associated with the organic non-solvent used in precipitation. Non-solvent distillation (e.g., IPA distillation) costs are high due to the relatively low yield of gum produced from these processes, and due to the energy associated with the distillation of non-solvent mixtures, which contain a large amount of impurities (e.g., non-IPA components). Certain embodiments of the present invention can reduce the amount of non-solvent that requires distillation, and thus the losses associated with distillation for the recovery of the non-solvent can be reduced, and the energy costs associated with distillation can be decreased.

The following examples are included to demonstrate preferred embodiments of the invention. It should be appreciated by those of skill in the art that the techniques disclosed in the examples, which follow, represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

In the following examples heat treatments of xanthan gum were performed on raw fermentation broths and other aqueous solutions of xanthan gum in a lab Parr pressure reactor for 30 minutes, unless otherwise specified. After heat treatment, the gum was precipitated from the broth by injecting a stream of broth along with a stream of isopropyl alcohol (IPA) into the suction side of a lab homogenizer. The precipitate was collected in a lab basket-type centrifuge. Excess liquid was removed by pressing the gum between sheets of blotter paper. The gum was dried overnight in a solvent-proof forced-air oven at 33° C.

For studies on the effects of gum concentration, concentrations were increased by microfiltration, or decreased by the addition of filtrate from microfiltration. In this way, all characteristics of the broth were held constant save for gum concentration.

For comparisons of levels of isopropyl alcohol (IPA), either filtrate, pure IPA, or a mixture of filtrate and IPA was added to the broth so that final gum concentrations were the same.

All viscosity measurements were made on the rehydrated final, dried product. The dry gum was rehydrated in an aqueous solution containing 0.1% NaCl and 0.015% $CaCl_2 2H_2O$, at 0.25% gum concentration, with mixing, for 1 hour. Viscosities were measured using a DVII Brookfield Viscometer with the small sample adapter and #18 spindle, at 0.6 rpm (approx. 0.4 $s^{-1}$ shear rate). All viscosities referred to in these examples are the viscosities of gum after it has been heat-treated, precipitated, dried, and then rehydrated to 0.25% ds.

EXAMPLE 1

Effect of Isopropanol Content During Heat Treatment on the Viscosity of Rehydrated Xanthan Gum.

Figure 3:
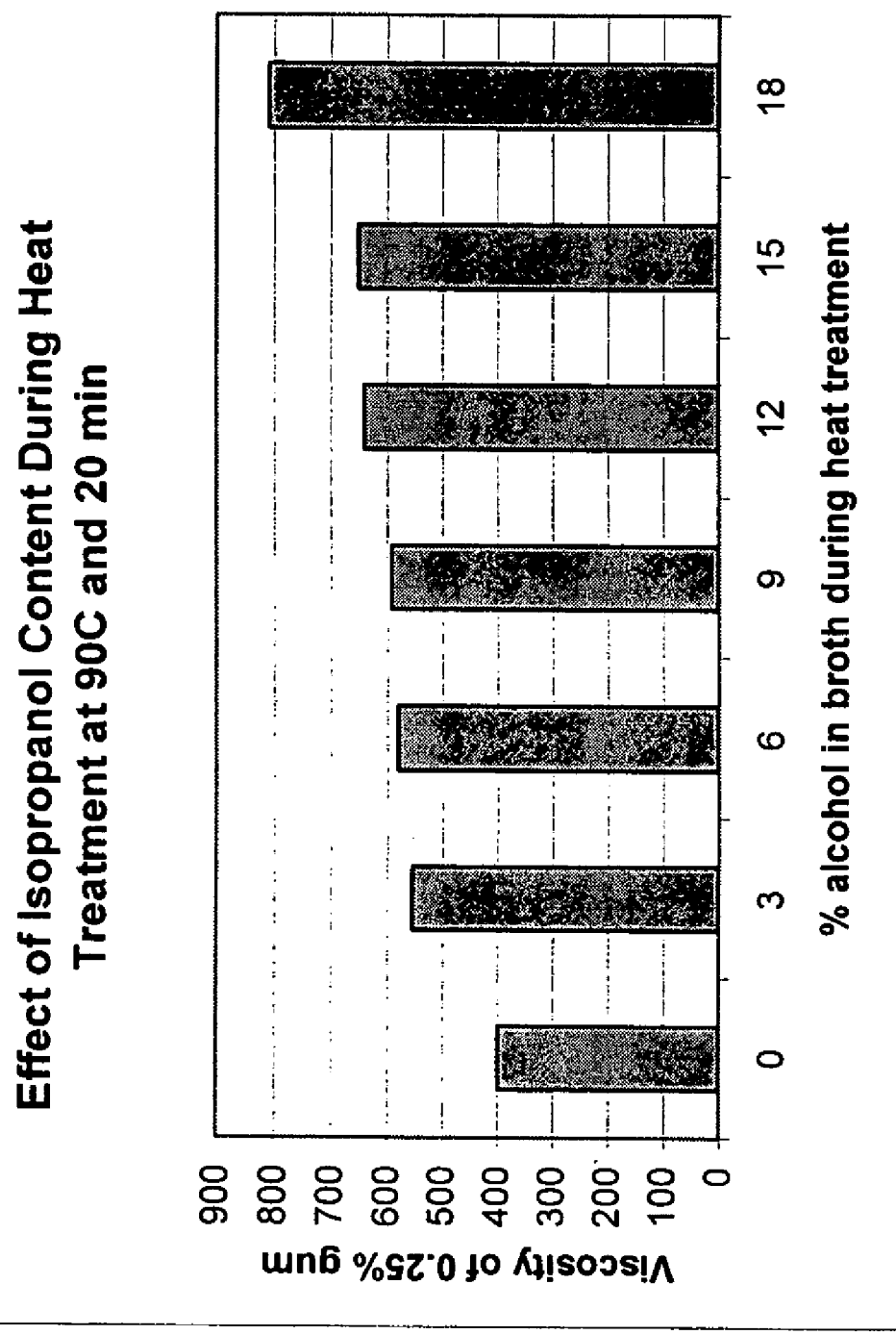
FIG. 3 depicts the effect of isopropanol content during heat treatment of xanthan gum in broth for 20 minutes at 90 degrees Celsius.

FIG. 3 shows the effect of IPA content in the fermentation broth during heat treatment on the viscosity of the rehydrated gum. Each broth was heat treated at 90° C. for 20 minutes. The gum viscosity increased steadily as IPA concentration in the broth increased.

Rehydrated gum viscosity continues to increase with increases in IPA content in the broth during heat treatment through at least 30%, by weight, of the broth. FIG. 3 illustrates the increase in xanthan gum viscosity when IPA was increased from 0%, through 15%, up to 30%.

EXAMPLE 2

Figure 4:
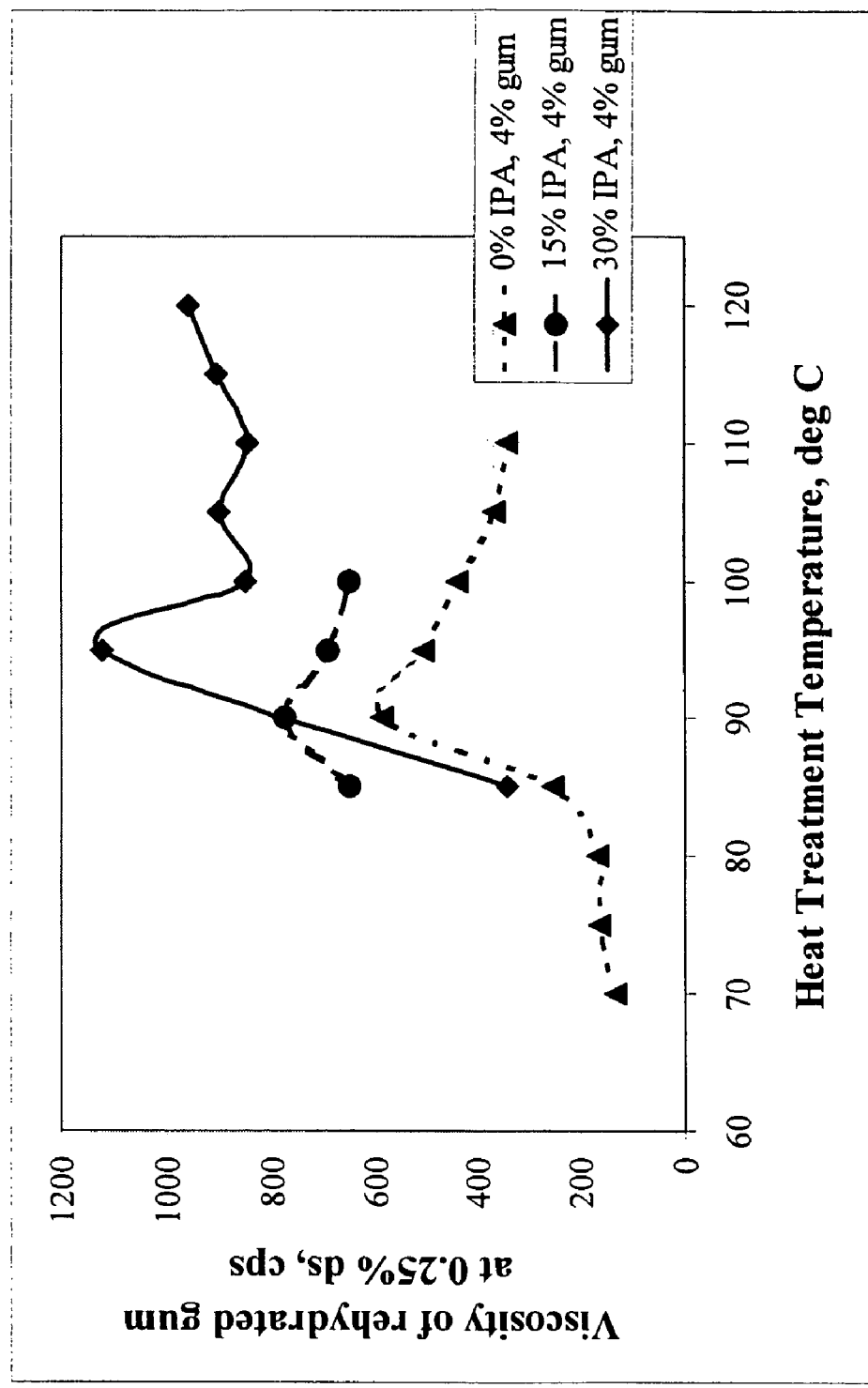
FIG. 4 depicts the effect on viscosity of a xanthan gum depending on the temperature used during heat treatment.

Effect of IPA Concentration in the Broth, and Temperature, During 30 min Heat Treatments on the Viscosities of the Xanthan Gum after Rehydration FIG. 4 shows the effect of temperature during heat treatment on final gum viscosity. There exists a minimum temperature necessary for optimum viscosity development. Above this minimum, and especially with high IPA concentrations in the fermentation broth, the final gum viscosities remain high. That is, it is not necessary to hit the optimum temperature to attain high gum viscosity, only to exceed the minimum temperature. This figure also illustrates the effect of IPA concentration in the broth on the viscosity of the dry gum. Increasing IPA concentration through about 30% significantly increases gum viscosity.

EXAMPLE 3

Effect of Increasing Xanthan Gum Concentration in Broth during Heat Treatment

Figure 5:
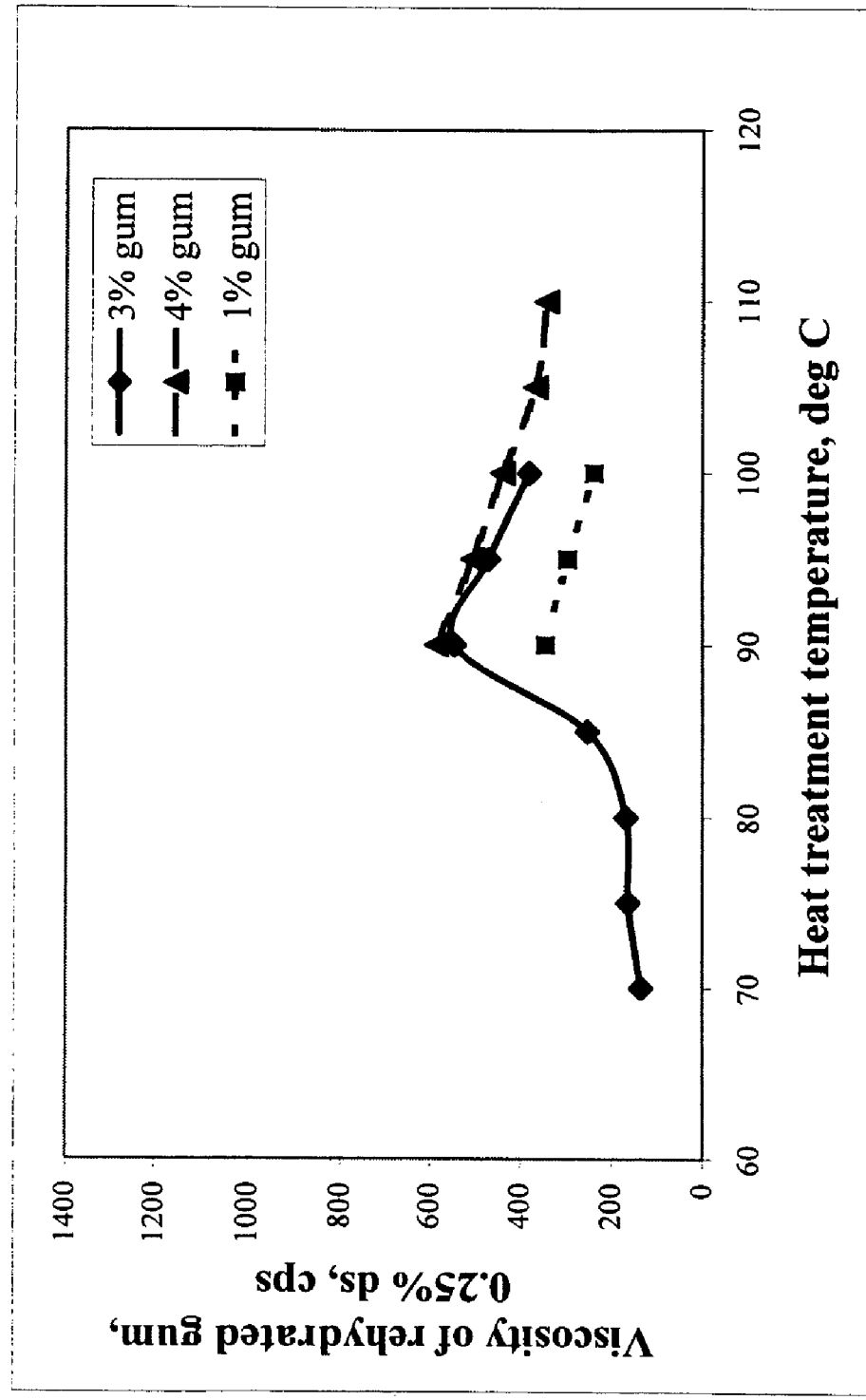
FIG. 5 depicts the effect on viscosity of a xanthan gum depending on the temperature used during heat treatment and the concentration of the xanthan gum in solution without isopropanol.
Figure 6:
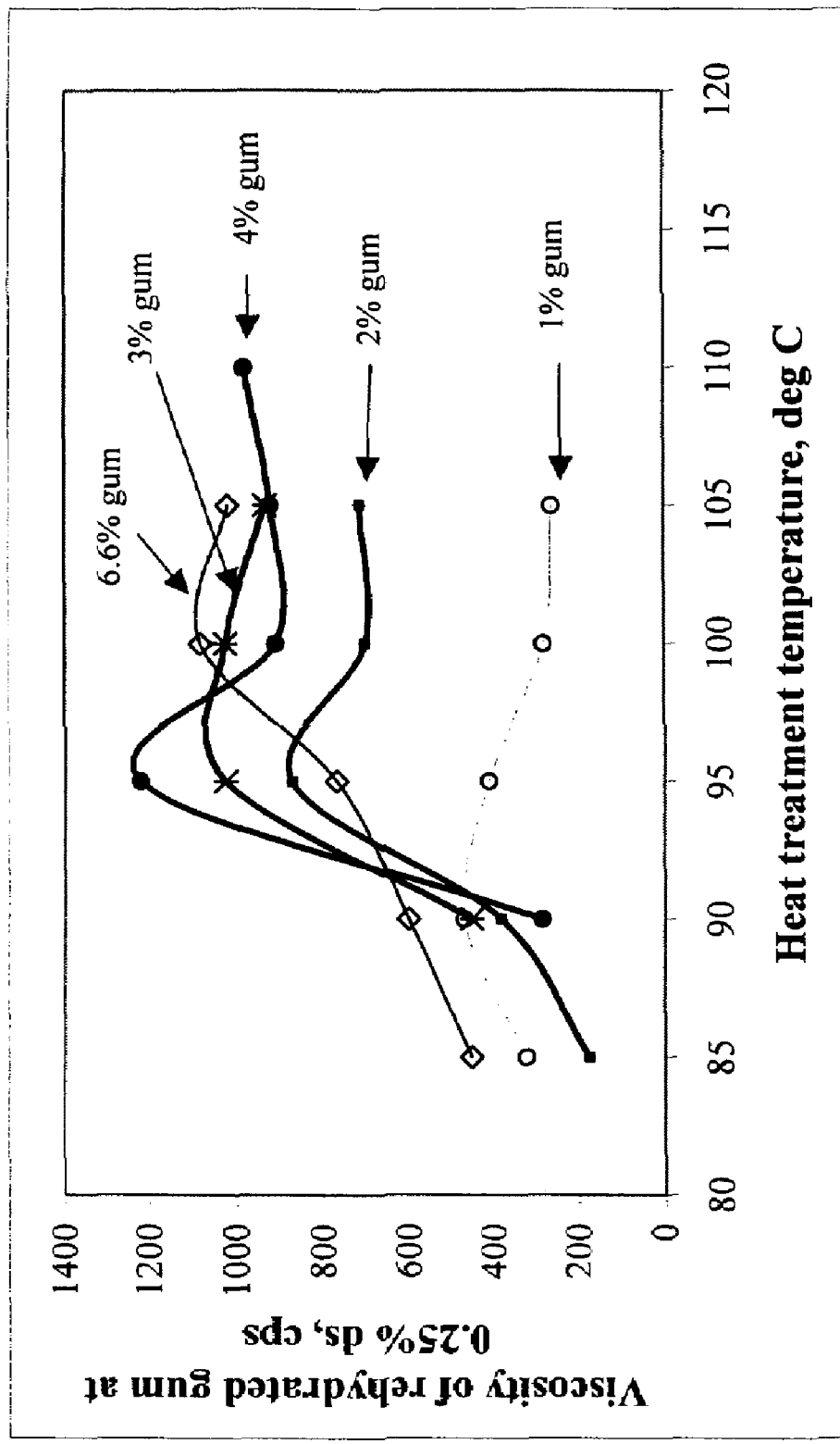
FIG. 6 depicts the effect on viscosity of a xanthan gum depending on the temperature used during heat treatment and the concentration of the xanthan gum in solution with isopropanol.

FIGS. 5 and 6 show that increases in gum concentration in the broth during heat treatment increase the viscosity of the final gum. This is true whether the fermentation broth contains IPA during heat treatment or not, but is amplified with the presence of IPA. FIG. 5 shows the effect in absence of any IPA during heat treatment; and FIG. 6 shows the effect when the broth contained 30% IPA during heat treatment.

The effect of increasing gum concentration during heat treatment reaches a maximum with about 3% gum. With further increases in gum concentration, no advantage is gained in final product viscosity. On the other hand, the gum concentration can be increased to 6.6% and higher before heat treatment without compromising the quality of the product. This offers clear advantages in, for example, minimizing the amount of non-solvent needed to precipitate the gum.

EXAMPLE 4

Effect of Source of IPA Used in the Heat Treatment of Xanthan Gum

Figure 7:
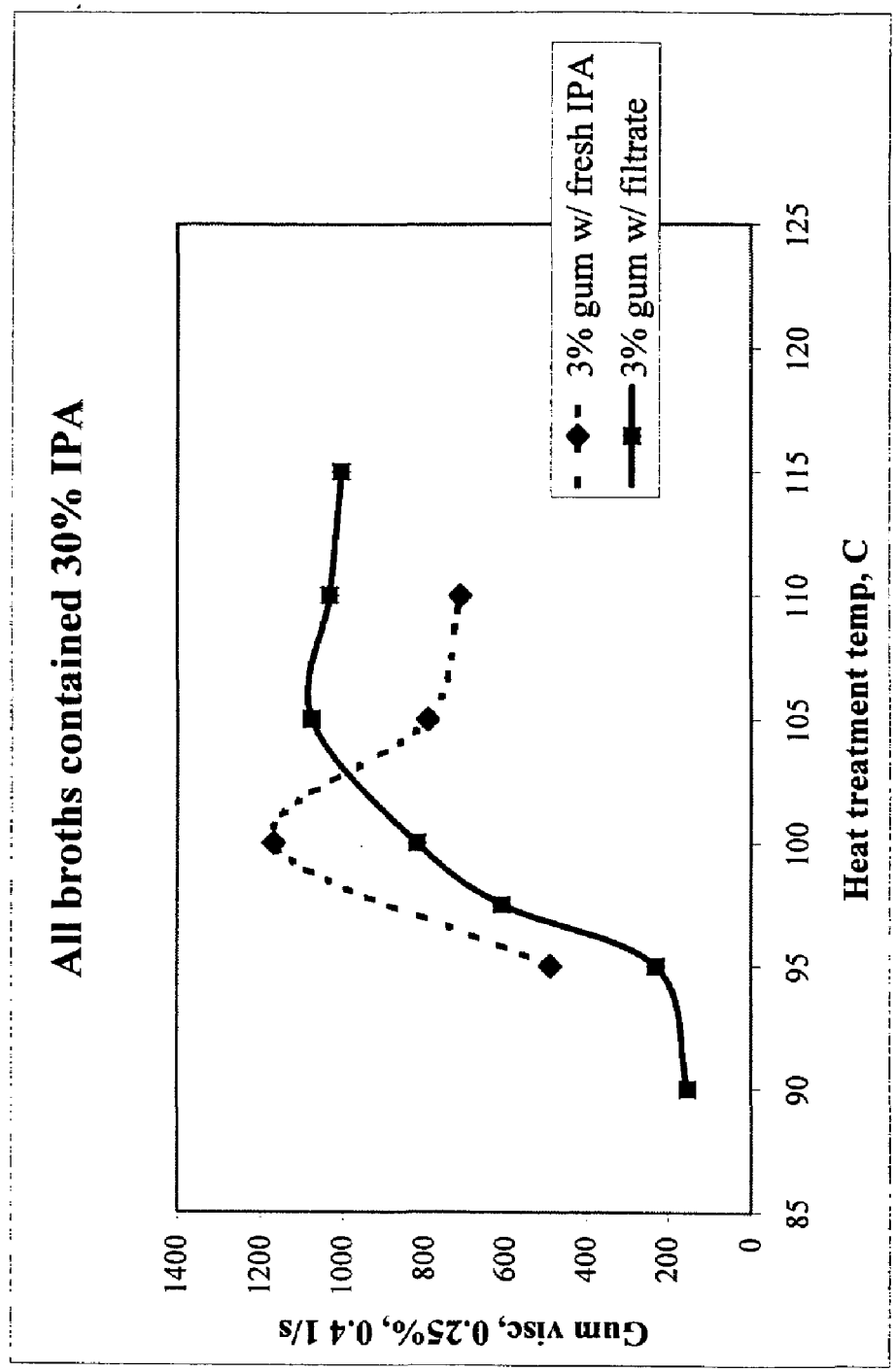
FIG. 7 depicts the effect on viscosity of a xanthan gum depending on whether the isopropanol used in the heat treatment is distilled isopropanol or recycled isopropanol.

Whether the IPA in the broth during heat-treatment is freshly distilled, or originates from a recycle stream in the process, has little effect on the final gum viscosity. FIG. 7 shows a comparison of gum viscosity from fermentation broths heat-treated with the addition of pure (99%) IPA, and with the addition of aqueous IPA collected after separating precipitated gum from filtrate in a previous treatment. The fermentation broth containing the filtrate perhaps requires a few degrees higher to reach its minimum for viscosity development, but the viscosities of the gums treated above this minimum are very similar. In fact, the product heat-treated with filtrate appears to be more robust to higher temperature during treatment.

EXAMPLE 5

Effect on Final Xanthan Gum Viscosity Depending on Length of Heat Treatment

Figure 8:
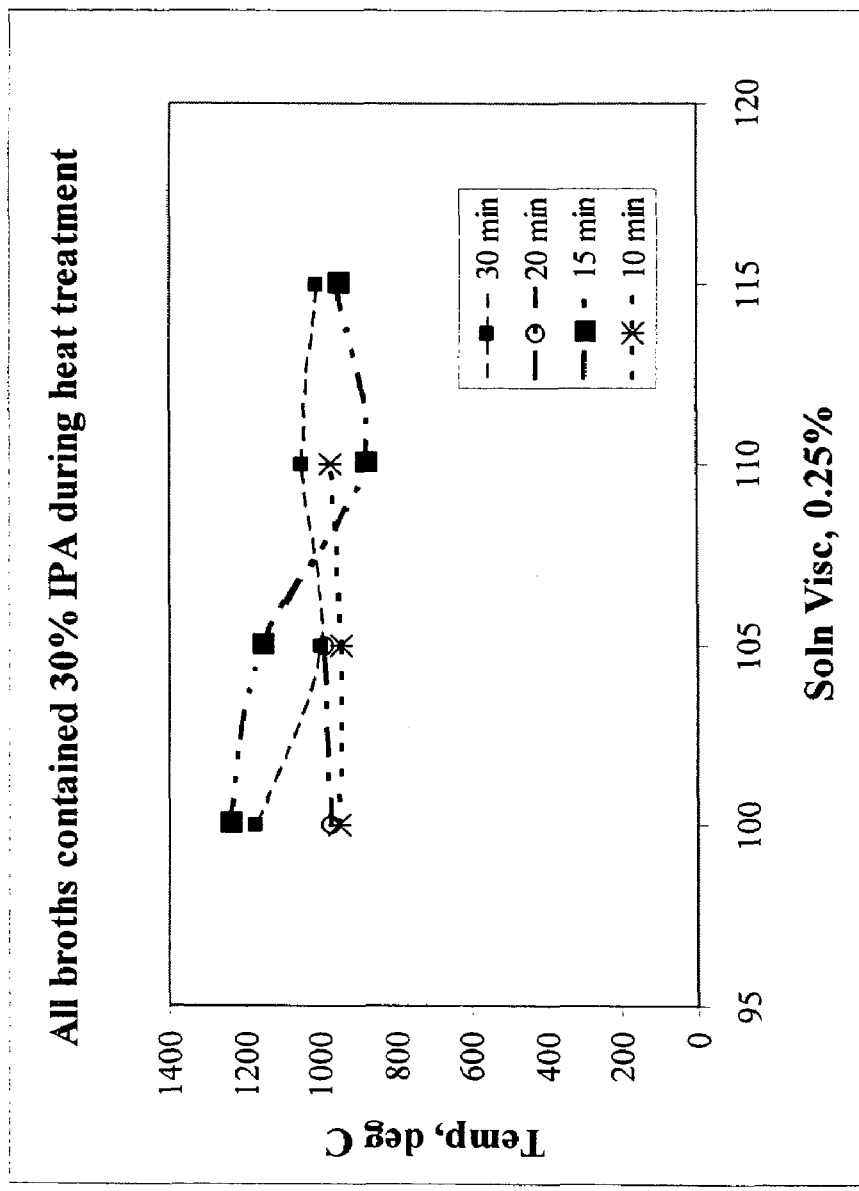
FIG. 8 depicts the effect on viscosity of a xanthan gum depending on length of heat treatment.

Final gum viscosity appears to be largely insensitive to treatment time. FIG. 8 shows the viscosities of gums that were held at treatment temperature for times as short as 10 minutes, and as long as 30 minutes and in the presence of 30% isopropanol. There is little difference among them.

The viscosity-enhancing effects of these alcohol heat-treatments are most pronounced with "low quality" gum. Quality of xanthan gum is assessed by its ability to build viscosity in water, at low concentrations. High viscosity gums command a premium price in the industry. The viscosity of the raw fermentation broth is a good predictor of gum viscosity after heat-treatment, precipitation and drying. The molecular weight of the gum is also a predictor of relative solution viscosity of xanthan gum (as well as other polymers).

EXAMPLE 6

Viscosities of Raw Fermentation Broth As Compared To Viscosities of Xanthan Gums Recovered from Dilute Solution FIG. 9 compares fermentation broths heat-treated in a conventional manner, and heat treated after the addition of IPA (30%). The viscosities of the conventionally-heat-treated gums correlate with broth viscosities, and with gum molecular weights. The concentration of the xanthan gums in solution was 2.2%. The gums heat-treated with IPA all have much higher viscosities. Viscosities were measured using a Brookfield viscometer at 60 rpm. The % increase in viscosity due to the presence of IPA is most pronounced for the lowest viscosity broth (lowest molecular weight gum). As gum "quality" improves, the ability of IPA to enhance viscosity is diminished. Still, the top quality gum, which at 944 cps viscosity after conventional heat treatment would be considered at the high end of commercial products, experiences a viscosity increase of more than 40% when heat-treated in the presence of IPA.

The viscosity-enhancing effect of IPA during heat-treatment is not limited to the treatment of raw fermentation broths of xanthan gum. The viscosities of a number of commercially available, food-grade xanthan gum products (e.g., Keltrol, Keltrol RD, ADM 200, Rhodigel and Rhodigel Ultra) were significantly increased by heat-treating them with alcohol. To do this, they were dissolved at 2.5% concentration in a 90/10 mixture of water and IPA, and then heated at 95° C. for 30 minutes. They were then precipitated and dried. The solution viscosities of these products with and without the IPA heat treatment are compared in FIG. 10. As a control, a sample of xanthan gum (e.g., lab generated) which had already been subjected to heat-treatment in the presence of 30% IPA, precipitated and dried, was treated in the same way as the commercial gums.

The viscosities of all the commercial xanthan gums were significantly increased by the alcohol-heat-treatment. The only gum to lose viscosity as a result of the heat treatment was the lab sample, which had previously been treated with a higher concentration of alcohol.

The significance of this finding is that "low quality" xanthan gum currently excluded from the premium markets can be easily converted to a high viscosity, premium product.

EXAMPLE 7

Conventional Process

A starting xanthan gum broth was prepared by dissolving 45 pounds of Rodigel EZ in city water to a concentration of 3.5% gum by weight. The broth was pumped through a continuous heat treatment at 99 degrees C. with a residence time of 20 minutes. The heat treated broth was mixed with sufficient 83.1% isopropyl alcohol to cause precipitation resulting in a liquid mixture that was 56.9% isopropyl alcohol by weight. The xanthan fibers were separated from the liquid with a centrifuge and the filtrate collected for future recycle. The fibers were dried and analyzed for viscosity. The following table documents the mass balance throughout the process:

TABLE 1

| | Trial #1 With No Alcohol Recycle Pounds | | | |
|---|---|---|---|---|
| | Gum | Alcohol | Water | Total |
| Fermentation Product | 45.0 | 0.0 | 1240.7 | 1285.7 |
| First Concentrate | 45.0 | 0.0 | 1240.7 | 1285.7 |
| Recycled Alcohol | 0.0 | 0.0 | 0.0 | 0.0 |
| Mix Product | 45.0 | 0.0 | 1240.7 | 1285.7 |
| Second Permeate | 0.0 | 0.0 | 0.0 | 0.0 |
| Second Concentrate | 45.0 | 0.0 | 1240.7 | 1285.7 |
| Fresh Alcohol | 0.0 | 2239.2 | 455.4 | 2694.5 |
| Separation Feed | 45.0 | 2239.2 | 1696.1 | 3980.2 |
| Separation Filtrate | 0.0 | 2232.8 | 1658.5 | 3891.3 |
| Dryer Feed | 45.0 | 6.3 | 37.6 | 88.9 |

The simulated broth was not concentrated prior to precipitation. Therefore, the first concentrate, the mix product, and the second concentrate were identical. The amount of fresh alcohol required to cause precipitation at 56.9% isopropyl alcohol concentration was 2.1 pounds of source alcohol per pound of water in the simulated fermentation broth. The resulting dried xanthan gum had a viscosity of 850 centipoise as measured by a Brookfield viscometer with a SS#18 spindle at 0.6 rpm at a 0.25% gum concentration.

EXAMPLE 8

Broth Concentration and Alcohol Recycle

A starting Xanthan Gum broth was prepared by standard fermentation practice using *Xanthomonas* bacterium to achieve a gum concentration of 3.15% by weight. The broth was microfiltered through 0.05 micron ceramic membranes to concentrate the broth to 7.1% gum by weight. Centrifuge filtrate (alcohol recycle) from Example 7 was mixed with the concentrated broth. The resulting mixture was re-concentrated with 0.05 micron ceramic membranes to a gum concentration of 5.1% by weight. The re-concentrated broth with an alcohol concentration of 31.8% by weight was pumped through a continuous heat treatment at 99 degrees C. with a residence time of 20 minutes. The heat treated broth was mixed with sufficient 83.1% isopropyl alcohol to cause precipitation resulting in a liquid mixture that was 67.2% isopropyl alcohol by weight. The xanthan fibers were separated from the liquid with a centrifuge and the filtrate collected for future recycle. The fibers were dried and analyzed for viscosity. The following table documents the mass balance throughout the process:

TABLE 2

| | Trial #2 With Alcohol Recycle From Trial #1 Pounds | | | |
|---|---|---|---|---|
| | Gum | Alcohol | Water | Total |
| Fermentation Product | 49.5 | 0.0 | 1521.9 | 1571.4 |
| First Concentrate | 49.5 | 0.0 | 650.6 | 700.1 |
| Recycled Alcohol | 0.0 | 464.2 | 344.8 | 809.0 |
| Mix Product | 49.5 | 464.2 | 995.5 | 1509.1 |
| Second Permeate | 0.0 | 171.9 | 368.6 | 540.5 |
| Second Concentrate | 49.5 | 292.3 | 626.9 | 968.7 |
| Fresh Alcohol | 0.0 | 1700.7 | 345.9 | 2046.6 |
| Separation Feed | 49.5 | 1993.0 | 972.8 | 3015.3 |
| Separation Filtrate | 4.4 | 1979.1 | 926.4 | 2909.9 |
| Dryer Feed | 45.1 | 13.9 | 46.4 | 105.4 |

The amount of fresh alcohol required to cause precipitation at 67.2% isopropyl alcohol concentration was 3.15 pounds of source alcohol per pound of water in the first concentrate. The resulting dried xanthan gum had a viscosity of 1180 centipoise as measured by a Brookfield viscometer with a SS#18 spindle at 0.6 rpm at a 0.25% gum concentration. If centrifuge filtrate from Example 7 had not been mixed and re-concentrated, the amount of alcohol required to precipitate at 67.2% alcohol concentration would have been 4.23 pounds of source alcohol per pound of water in the first concentrate. If the conventional process had been used on the above fermentation broth, 6432.2 pounds of source alcohol would have been required to precipitate at 67.2% alcohol concentration. The claimed process reduced source alcohol usage by 68%. The dried gum produced by the claimed process had a viscosity 39% greater than a competitive gum produced through a conventional process.

EXAMPLE 9

Broth Concentration and Alcohol Recycle

A starting xanthan gum broth was prepared by standard fermentation practice using *Xanthomonas* bacterium to achieve a gum concentration of 3.29% by weight. The broth was microfiltered through 0.05 micron ceramic membranes to concentrate the broth to 7.7% gum by weight. Centrifuge filtrate (alcohol recycle) from Example 8 was mixed with the concentrated broth. The resulting mixture was re-concentrated with 0.05 micron ceramic membranes to a gum concentration of 4.84% by weight. The re-concentrated broth with an alcohol concentration of 39% by weight was pumped through a continuous heat treatment at 99 degrees C. with a residence time of 20 minutes. The heat treated broth was mixed with sufficient 83.1% isopropyl alcohol to cause precipitation resulting in a liquid mixture that was 63.0% isopropyl alcohol by weight. The xanthan fibers were separated from the liquid with a centrifuge and the filtrate collected for future recycle. The fibers were dried and analyzed for viscosity. The following table documents the mass balance throughout the process:

TABLE 3

| | Trial #3 With Alcohol Recycle From Trial #2 Pounds | | | |
|---|---|---|---|---|
| | Gum | Alcohol | Water | Total |
| Fermentation Product | 44.5 | 0.0 | 1308.1 | 1352.6 |
| First Concentrate | 44.5 | 0.0 | 531.8 | 577.4 |
| Recycled Alcohol | 1.1 | 486.3 | 228.8 | 715.1 |
| Mix Product | 45.6 | 486.3 | 760.6 | 1292.5 |
| Second Permeate | 0.0 | 136.7 | 213.7 | 350.4 |
| Second Concentrate | 45.6 | 349.6 | 546.9 | 942.1 |
| Fresh Alcohol | 0.0 | 889.7 | 180.9 | 1070.6 |
| Separation Feed | 45.6 | 1239.3 | 727.8 | 2012.7 |
| Separation Filtrate | 4.2 | 1231.3 | 691.8 | 1927.3 |
| Dryer Feed | 41.4 | 8.0 | 35.9 | 85.4 |

The amount of fresh alcohol required to cause precipitation at 63.0% isopropyl alcohol concentration was 2.01 pounds of source alcohol per pound of water in the first concentrate. The resulting dried xanthan gum had a viscosity of 1390 centipoise as measured by a Brookfield viscometer with a SS#18 spindle at 0.6 rpm at a 0.25% gum concentration. If centrifuge filtrate from Example 8 had not been mixed and re-concentrated, the amount of alcohol required to precipitate at 63.0% alcohol concentration would have been 3.13 pounds of source alcohol per pound of water in the first concentrate. If the conventional process had been used on the above fermentation broth, 4100 pounds of source alcohol would have been required to precipitate at 63.0% alcohol concentration. The claimed process reduced source alcohol usage by 74%. The dried gum produced by the claimed process had a viscosity 64% greater than a competitive gum produced through a conventional process.

EXAMPLE 10

Broth Concentration and Alcohol Recycle

A starting xanthan gum broth was prepared by standard fermentation practice using *Xanthomonas* bacterium to achieve a gum concentration of 3.10% by weight. The broth was microfiltered through 0.05 micron ceramic membranes to concentrate the broth to 6.83% gum by weight. Centrifuge filtrate (alcohol recycle) from Example 9 was mixed with the concentrated broth. The resulting mixture was re-concentrated with 0.05 micron ceramic membranes to a gum concentration of 4.62% by weight. The re-concentrated broth with an alcohol concentration of 36.4% by weight was pumped through a continuous heat treatment at 99 degrees C. with a residence time of 20 minutes. The heat treated broth was mixed with sufficient 83.1% isopropyl alcohol to cause precipitation resulting in a liquid mixture that was 56.8% isopropyl alcohol by weight. The xanthan fibers were separated from the liquid with a centrifuge and the filtrate collected for future recycle. The fibers were dried and analyzed for viscosity. The following table documents the mass balance throughout the process:

TABLE 4

| | Trial #4 With Alcohol Recycle From Trial #3 Pounds | | | |
|---|---|---|---|---|
| | Gum | Alcohol | Water | Total |
| Fermentation Product | 39.6 | 0.0 | 1237.8 | 1277.4 |
| First Concentrate | 39.6 | 0.0 | 541.5 | 581.1 |
| Recycled Alcohol | 1.6 | 457.0 | 257.0 | 715.6 |
| Mix Product | 41.2 | 457.0 | 798.5 | 1296.7 |
| Second Permeate | 0.0 | 147.4 | 257.5 | 404.9 |
| Second Concentrate | 41.2 | 309.6 | 541.0 | 891.8 |
| Fresh Alcohol | 0.0 | 548.4 | 111.5 | 659.9 |
| Separation Feed | 41.2 | 858.0 | 652.5 | 1551.7 |
| Separation Filtrate | 6.0 | 853.9 | 621.8 | 1481.7 |
| Dryer Feed | 35.2 | 4.1 | 30.7 | 70.0 |

The amount of fresh alcohol required to cause precipitation at 56.8% isopropyl alcohol concentration was 1.22 pounds of source alcohol per pound of water in the first concentrate. The resulting dried xanthan gum had a viscosity of 1360 centipoise as measured by a Brookfield viscometer with a SS#18 spindle at 0.6 rpm at a 0.25% gum concentration. If centrifuge filtrate from Example 9 had not been mixed and re-concentrated, the amount of alcohol required to precipitate at 56.8% alcohol concentration would have been 2.16 pounds of source alcohol per pound of water in the first concentrate. If the conventional process had been used on the above fermentation broth, 2673.3 pounds of source alcohol would have been required to precipitate at 56.8% alcohol concentration. The claimed process reduced source alcohol usage by 75%. The dried gum produced by the claimed process had a viscosity 60% greater than a competitive gum produced through a conventional process.

EXAMPLE 11

Broth Concentration and Total Alcohol Recycle

A starting xanthan gum broth is prepared by standard fermentation practice using *Xanthomonas* bacterium to achieve a gum concentration of 3.00% by weight. The broth is microfiltered through 0.05 micron ceramic membranes to concentrate the broth to 7.50% gum by weight. All of the centrifuge filtrate (alcohol recycle) from a previous batch is mixed with the concentrated broth. The resulting mixture is re-concentrated with 0.05 micron ceramic membranes to a gum concentration of 7.50% by weight. The re-concentrated broth with an alcohol concentration of 35.4% by weight is pumped through a continuous heat treatment at 99 degrees C. with a residence time of 20 minutes. The heat treated broth is mixed with sufficient 83.1% isopropyl alcohol to cause precipitation resulting in a liquid mixture that is 55.0% isopropyl alcohol by weight. The xanthan fibers are separated from the liquid with a centrifuge and the filtrate is recycled while the fibers are dried. The following table documents the mass balance throughout this process:

TABLE 5

| | Prophetic Total Alcohol Recycle Pounds | | | |
|---|---|---|---|---|
| | Gum | Alcohol | Water | Total |
| Fermentation Product | 40.0 | 0.0 | 1293.3 | 1333.3 |
| First Concentrate | 40.0 | 0.0 | 493.3 | 533.3 |
| Recycled Alcohol | 1.0 | 461.7 | 349.8 | 811.5 |
| Mix Product | 41.0 | 461.7 | 843.1 | 1344.8 |
| Second Permeate | 0.0 | 282.4 | 515.7 | 798.1 |
| Second Concentrate | 41.0 | 179.3 | 327.4 | 546.7 |
| Fresh Alcohol | 0.0 | 293.9 | 59.8 | 353.7 |
| Separation Feed | 41.0 | 473.2 | 387.2 | 900.4 |
| Separation Filtrate | 1.0 | 461.7 | 349.8 | 811.5 |
| Dryer Feed | 40.0 | 11.6 | 37.3 | 88.9 |

The amount of fresh alcohol required to cause precipitation at 55.0% isopropyl alcohol concentration is 0.72 pounds of source alcohol per pound of water in the first concentrate. The resulting dried xanthan gum has a viscosity of 1300–1400 centipoise when measured by a Brookfield viscometer with a SS#18 spindle at 0.6 rpm at a 0.25% gum concentration. If centrifuge filtrate is not mixed and re-concentrated, the amount of alcohol required to precipitate at 55.0% alcohol concentration will be 1.96 pounds of source alcohol per pound of water in the First Concentrate. If the conventional process is used on the above fermentation broth, 2531.4 pounds of source alcohol is required to precipitate at 55.0% alcohol concentration. The claimed process thus reduces source alcohol usage by 86%. The dried gum produced by the claimed process has a viscosity 53–65% greater than a competitive gum produced through a conventional process.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents, which are chemically related, may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of recovering xanthan gum from an aqueous fluid, comprising:
   providing an aqueous fluid comprising water and at least about 1 wt % and 10 wt % xanthan gum, wherein the xanthan gum is substantially dissolved in the aqueous fluid,
   mixing the aqueous fluid and an organic non-solvent stream comprising water and an organic non-solvent of xanthan gum, thereby producing a first mixture, wherein the first mixture comprises a sub-precipitant concentration of the organic non-solvent;
   concentrating the first mixture, thereby increasing the xanthan gum concentration, wherein after concentrating the organic non-solvent concentration in the first mixture is below the minimum concentration at which the xanthan gum begins to precipitate;
   heating the first mixture to a temperature of between about 90° C. and about 125° C. for at least about five minutes; and
   mixing an additional amount of organic non-solvent with the first mixture, thereby producing a second mixture, wherein the second mixture comprises (A) a liquid component comprising organic non-solvent and water, wherein the organic non-solvent concentration in the second mixture is sufficient to precipitate a majority of the xanthan gum present in the second mixture, and (B) precipitated xanthan gum.

2. The method of claim 1, further comprising the step of separating the second mixture into a first fraction and a second fraction, wherein the first fraction comprises a majority of the liquid component and the second fraction comprises substantially all of the precipitated xanthan gum.

3. The method of claim 2, wherein the organic non-solvent stream comprises the first fraction.

4. The method of claim 2, further comprising drying the second fraction to produce a dried xanthan gum product.

5. The method of claim 4, further comprising washing the second fraction with an organic non-solvent or a first solution comprising water and an organic non-solvent, wherein the concentration of the organic non-solvent in the first solution is greater than the concentration sufficient to precipitate a majority of the xanthan gum.

6. The method of claim 4, wherein the dried xanthan gum product, when rehydrated in water, has a viscosity that is at least 10% greater than that of a rehydrated dried xanthan gum product prepared by a method comprising,
   providing a second aqueous fluid comprising water and xanthan gum having the same composition as that provided for preparing the first dried polysaccharide gum product;
   heat treating the second aqueous fluid at the same temperature and for the same duration as the first mixture in preparing the first dried polysaccharide gum;
   mixing sufficient organic non-solvent with the heat-treated second aqueous fluid, thereby producing a third mixture, wherein the third mixture comprises (A) a liquid component comprising the organic non-solvent and water, wherein the organic non-solvent concentration in the third mixture is sufficient to precipitate a majority of the xanthan gum present in the third mixture, and (B) a second precipitated xanthan gum;
   separating the third mixture into an A fraction and a B fraction, wherein the A fraction comprises a majority of the liquid component and the B fraction comprises substantially all of the second precipitated xanthan gum; and
   drying the B fraction to produce a second dried xanthan gum product.

7. The method of claim 1, wherein the organic non-solvent is selected from the group consisting of isopropyl alcohol, methanol, ethanol, acetone, and mixtures thereof.

8. The method of claim 1, wherein the organic non-solvent is isopropyl alcohol and the sub-precipitant amount of organic non-solvent in the first mixture is between about 5 and 45% by weight of the first mixture.

9. The method of claim 8, wherein the sub-precipitant amount of organic non-solvent in the first mixture is between about 20% and 40% by weight of the first mixture.

10. The method of claim 8, wherein the sub-precipitant amount of organic non-solvent in the first mixture is between about 30% to 40% by weight of the first mixture.

11. The method of claim 1, wherein the concentrating step comprises filtering the first mixture.

12. The method of claim 1, wherein the heating step is performed before the concentrating step.

13. The method of claim 1, wherein the heating step is performed after the concentrating step.

14. The method of claim 1, wherein the heating step is performed simultaneously with the concentrating step.

15. A method of preparing a xanthan gum comprising:
   dissolving a commercially available xanthan gum in water at a concentration of from about 1% to 10% to provide an aqueous fluid,
   mixing the aqueous fluid and an organic non-solvent stream comprising water and an organic non-solvent of xanthan gum, thereby producing a first mixture, wherein the first mixture comprises a sub-precipitant concentration of the organic non-solvent,
   concentrating the first mixture, thereby increasing the xanthan gum concentration, wherein after the concentrating the organic non-solvent concentration in the first mixture is below the minimum concentration at which the xanthan gum begins to precipitate,
   heating the first mixture to a temperature of between about 90° C. and about 125° for at least about 5 minutes, and
   mixing an additional amount of organic non-solvent with the first mixture, thereby producing a second mixture, wherein the second mixture comprises (A) a liquid component comprising organic non-solvent and water, wherein the organic non-solvent concentration in the second mixture is sufficient to precipitate a majority of the xanthan gum present in the second mixture, and (B) precipitated xanthan gum.

* * * * *